United States Patent [19]

Thomas et al.

[11] 4,117,352

[45] Sep. 26, 1978

[54] INTEGRATED CLOCK DRIVE CIRCUIT

[75] Inventors: Jay A. Thomas; Victor J. Stalick, Jr., both of Sunnyvale, Calif.

[73] Assignee: GTE Automatic Electric Laboratories Incorporated, Northlake, Ill.

[21] Appl. No.: 805,204

[22] Filed: Jun. 9, 1977

[51] Int. Cl.² ............................................ H03K 1/17
[52] U.S. Cl. .................................... 307/269; 307/208; 307/232; 328/139; 307/352
[58] Field of Search ............... 307/269, 208, 232, 351, 307/352, 353; 328/109, 139

[56] References Cited

U.S. PATENT DOCUMENTS

| 3,657,732 | 4/1972 | Krause | 307/232 X |
| 3,707,683 | 12/1972 | Dotter | 328/139 |
| 3,947,697 | 3/1976 | Archer et al. | 307/269 X |
| 4,027,178 | 5/1977 | Larner | 307/269 |
| 4,064,541 | 12/1977 | Schneider et al. | 328/139 X |

Primary Examiner—John S. Heyman
Attorney, Agent, or Firm—Leonard R. Cool; Russell A. Cannon

[57] ABSTRACT

A buffer amplifier, which prevents loading of the input signal, accepts at its input an amplified and equalized pseudo-ternary signal. The output of the buffer amplifier is a-c coupled to the input of a precision differential amplifier, from which two output signals are obtained. One said output signal is representative of the positive pulses and the other said output signal is representative of the negative pulses of the pseudo-ternary signal. These two output signals are both applied to the inputs of a peak detector and a slicer. The d-c output of the peak detector is also applied as one input to the slicer. Separate outputs are obtained from the slicer, one each for the positive and negative pulse inputs, and these two outputs are summed, and the summed output is then amplified to provide a clock driver output.

10 Claims, 2 Drawing Figures

INTEGRATED CLOCK DRIVE CIRCUIT

BACKGROUND OF THE INVENTION

1. Field of the Invention

This invention relates to techniques for recovering timing information from a pseudo-ternary waveform and, more particularly, to a novel combination of discrete circuits with an integrated circuit used therefor.

2. Description of the Prior Art

The extensive use of centralized computers for data processing and the rapid growth in the use of pulse code modulation systems for the transmission of voice frequency information have created requirements for the transmission of large volumes of digital informatiom over available communication channels, such as telephone lines. While conventional binary transmission techniques may be, and have been, used in low-speed applications, multi-level systems, including the duobinary, modified duobinary, quaternary and higher level systems, are finding increasing use because of their high-speed capabilities. The modified duobinary data transmission system is described in U.S. Pat. No. 3,457,510.

In the transmission of information by digital signals, a series of time-divided equal intervals, called time slots, are employed. In such digital transmission systems, the applied signals are discrete in both time and amplitude, with the time duration of each signal element confined to one time slot. To recover the transmitted information, the received signal must be sampled in each time slot so as to determine the character of the signal element in each time slot. Because of degradation which occurs during transmission, the received signal is normally equalized to compensate for the most serious transmission path distortions of the signal and is amplified to attain an amplitude more nearly like that of the original signal. What is then required is a clock timing signal which permits sampling of each time slot at or near the optimum sampling time so that the discrete amplitudes originally transmitted may be reconstituted.

For binary, bipolar and the baseband duobinary signals, as well as for other digital signals of this type, acceptable timing signals may be obtained from the equalized and amplified received signal by nonlinear processing (rectification and clipping), which introduces a discrete component at the signaling rate. This is followed by a frequency selection circuit which may be a high Q narrow-band bandpass filter tuned to the timing frequency to extract the desired sinusoidal timing component of the input signal. This sinusoidal timing component is then amplified and limited to produce an approximate square wave at the signaling rate. Generally, the output is then applied to a pulse generator which generates narrow sampling pulses at a particular edge of the square wave. Phase shift correction is often necessary, and a phase shifter may be employed in the timing path to adjust the phase of the timing pulse so that the sample pulses occur at the proper location in each time slot. A brief discussion of timing recovery is included at pages 656 - 657 of the text "Transmission Systems For Communications", revised fourth edition, December 1971, Bell Telephone Laboratories, Inc.

A technique for producing a timing signal from a modified duobinary digital signal is disclosed in U.S. Pat. No. 3,707,683. It was noted therein the simple rectification technique disclosed hereinabove did not work well for the modified duobinary signals because of the intersymbol interference and phase structure, which caused the resultant timing signal to vanish. To overcome this problem, the technique disclosed employed a plurality of full-wave rectifiers. This was necessary to obtain a discrete component at the timing frequency from the modified duobinary signal prior to filtering. In a copending application, entitled "Apparatus and Method for Timing Recovery from a Pseudo-Ternary Signal", filed Feb. 17, 1977, Ser. No. 769,827, a technique of timing recovery is disclosed in which the incoming signal is sliced at a predetermined amplitude and only the upper-level portion is used for deriving the clock timing signal.

SUMMARY OF THE INVENTION

A circuit arrangement is disclosed in which the recovery of the timing information from an equalized pseudo-ternary waveform is obtained by means of the combination of amplifying, peak-amplitude detecting and slicing circuits which are provided by integrated circuits and in which the functions of a-c coupling, peak amplitude storing and phase correcting are provided by discrete components.

DETAILED DESCRIPTION OF THE INVENTION

Figure 1:
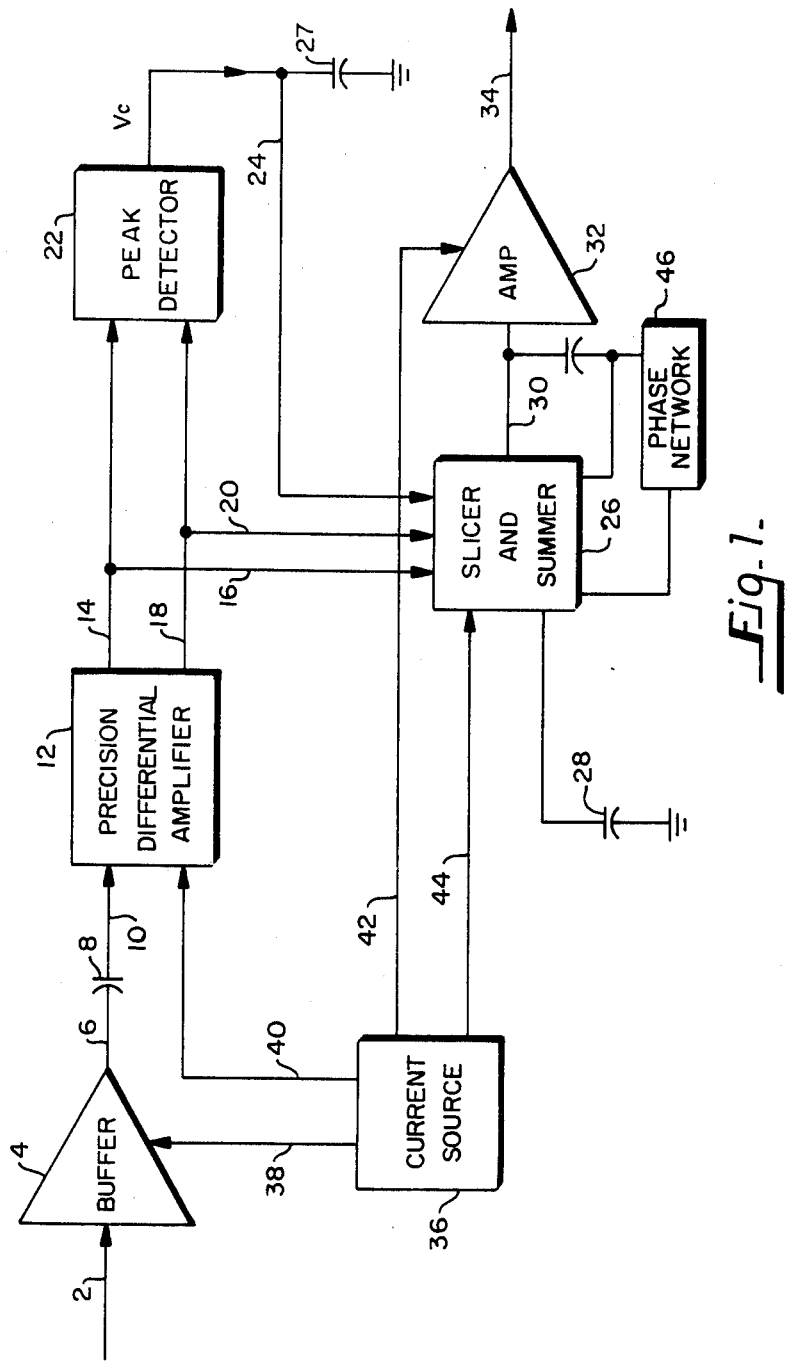
FIG. 1 is a block diagram showing the major elements in block form which are included in the integrated circuit, and the diagram also shows schematically certain of the discrete components.

Referring now to FIG. 1, an equalized and amplified pseudo-ternary signal may be obtained from digital transmission equipment as is well known; such equipment is not a part of this invention and is not shown. The equalized and amplified pseudo-ternary signal is applied via path 2 to buffer amplifier 4. The output of amplifier 4 is a-c coupled along path 6 through capacitor 8 to a precision differential amplifier 12. Amplifier 12 includes a precision gain amplifier which provides both inverted and noninverted outputs in response to the positive and negative excursions, respectively, of the pseudo-ternary signal. These separate outputs appear on paths 14 and 18 where they are directly applied to peak detector 22 and, via connections to paths 16 and 20, to slicer and summer 26. The peak output voltage, $V_c$, from peak detector 22 is stored in discrete capacitor 27, and this peak voltage is applied via path 24 to the input of slicer and summer 26. The peak voltage $V_c$ is used as a reference in establishing a slicing reference voltage level $V_s$. Discrete capacitor 28 is used to provide a low impedance circuit to ground, thus bypassing transients and minimizing variations in the slicer reference voltage $V_s$. The upper portions of the pulses from amplifier 12 are selected by the slicer and summed together to obtain a series of positive-going pulses in synchronism with the input signal pulses and are applied to amplifier 32 via path 30 and thence to a clock retiming circuit, not shown, via path 34. A current source 36 provides the reference current to buffer 4, precision amplifier 12, slicer and summer 26, and amplifier 32.

Figure 2:
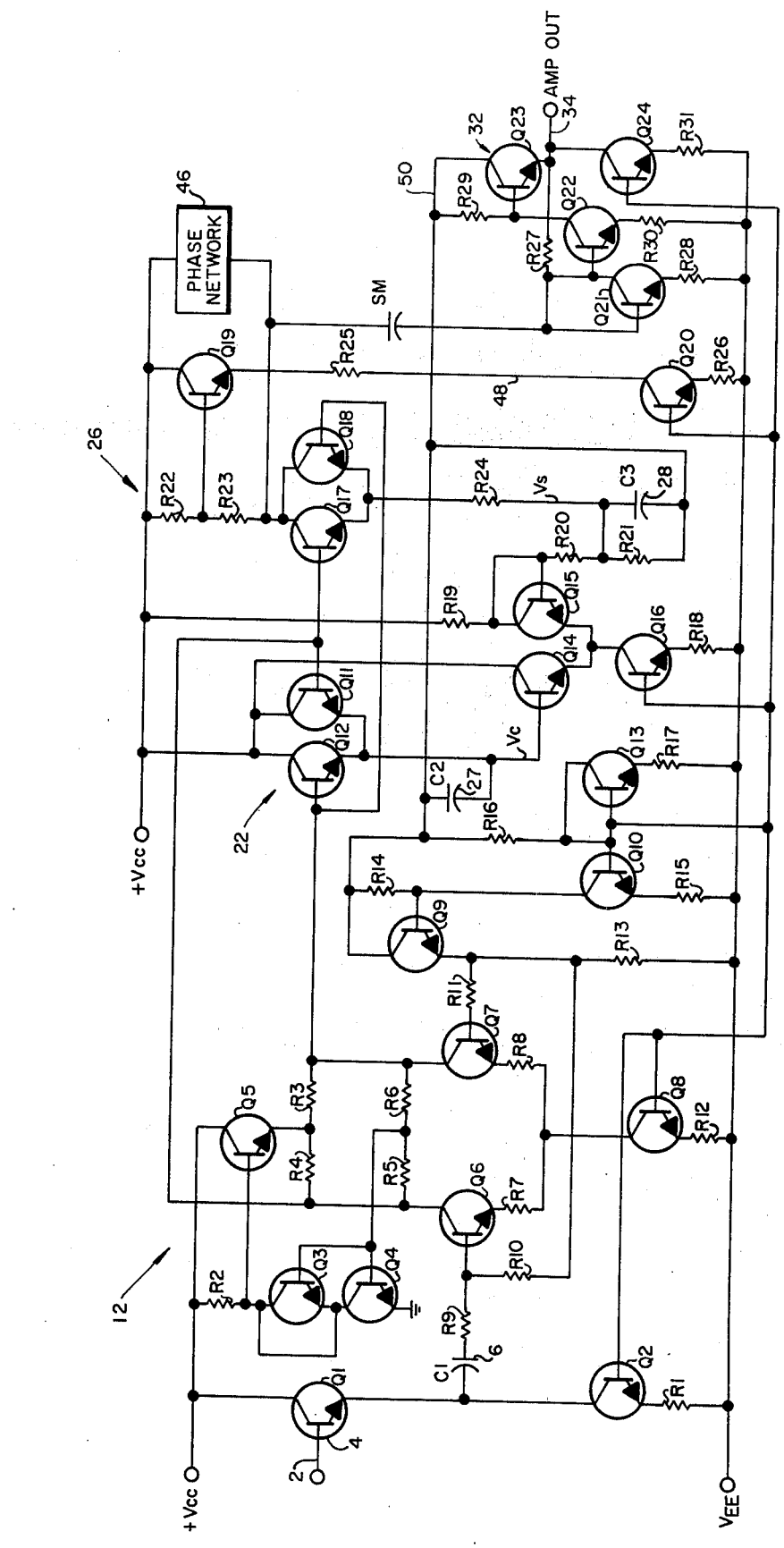
FIG. 2 is a schematic diagram of a preferred embodiment of the clock driver integrated circuit and also includes the connections and schematic representation of the discrete elements.

FIG. 2 is a complete schematic diagram of the integrated circuit which provides the functions shown in FIG. 1, and also includes additional discrete elements. Resistors R16 and R17 and transistor Q13 form the basic current reference source for the integrated circuit. As is well known, a low supply voltage is required for implementation of a circuit into bipolar IC technology. Assuming $V_{EE} = -4.9$ volts and a base-emitter voltage of 0.7 volts, the current through R17 is approximately 0.5 milliamperes. The current in all other current sources is in the ratio of R17 to the emitter resistor of the other sources times the current in R17. Thus, the current through transistor Q2 is R17/R1 × 0.5 milliamperes, where R1 = R17. Transistor Q2 is an active load for transistor Q1. Transistor Q1 is a unity voltage gain amplifier (buffer amplifier) used to prevent loading of the input signal, and its output is a-c coupled via discrete capacitor C1 to the base of transistor Q6 via resistor R9.

Transistors Q3 through Q10 and associated elements form a self-biased precision gain amplifier which provides both inverted and noninverted outputs from the collectors of Q6 and Q7, which are referenced to 0.7 volts (base-emitter voltage) above the common voltage point of the positive and negative power supplies $V_{CC}$ and $V_{EE}$. This potential is independent of the magnitude of the power supply sources. The availability of both the inverted and noninverted outputs is desirable because, as noted hereinabove, the input pseudo-ternary signal to the device consists of both positive and negative signal pulses. A first bias source is obtained from a current source consisting of transistor Q10 drawing current through resistor R14. This sets the bias voltage at the base of transistor Q9. The bias at the emitter of transistor Q9 is then equal to the base bias voltage of Q9 minus the base-emitter voltage of 0.7 volts. Resistor R13 is a passive load for transistor Q9. The a-c impedance looking back at the emitter of transistor Q9 is R14/Beta in parallel with resistor R13. The input signal to this gain stage is a-c coupled to the base of transistor Q6 via capacitor 6. Resistors R9 and R10 form a voltage divider that attenuates the input signal. Resistor R11 compensates for any offsets that would occur due to the base current of transistor Q6 flowing through resistor R10. A second bias source is controlled by transistor Q8 which provides a current source for the differential amplifiers Q6 - Q7. A third bias source provides a d-c reference for the collectors of the differential pair consisting of transistors Q6 and Q7. This third bias source is controlled by transistor Q4 via transistor Q5. What is desired here is to keep the bias point of the collectors of transistors Q6 and Q7 at 0.7 volts (1 base-emitter voltage) above ground to compensate for the base-emitter drop in transistors Q11 and Q12 of the peak detector. Matched resistors R5 and R6 are the Q6 and Q7 collector voltage sense resistors. As the bias voltage on the collectors of transistors Q6 and/or Q7 grows more positive, so does the voltage at the base of transistor Q4. This induces more current to flow through resistor R2, lowering the voltage at the base of transistor Q5 which, in turn, lowers the supply voltage to the matched load resistors, R3 and R4, of the differential pair transistors Q6 and Q7. Since the current is fixed through resistors R3 and R4, so is the voltage drop across each resistor. Therefore, as the voltage at the top of resistors R3 and R4 is lowered, the collector voltage of transistors Q6 and Q7 also drops. Thus, the loop maintains an exact bias voltage of one base-emitter above ground for the collectors of transistors Q6 and Q7. Transistor Q3 is connected as a capacitor to prevent oscillations in the feedback loop. The equivalent collector resistance of the Q6 side of the differential pair, consisting of transistors Q6 and Q7, is resistor R4 in parallel with resistor R5. Since $R_4 = R_3$ and $R_5 = R_6$, the collector load resistance for the Q7 side is the same. Hence, the differential gain is $R4\,R5/(R4+R5)R7$.

However, since we are using both the positive and negative portions of the signal, the single-ended gain is $R4\,R5/2(R4+R5)R7$ or 2. Thus, the overall gain from the input is $$\left(\frac{R4\,R5}{2(R4+R5)R7}\right)\left(\frac{R10}{R9+R10}\right).$$

The peak detector is comprised of transistors Q11 and Q12. The function of the peak detector is to find the peak height of the incoming waveform for both the positive and negative excursions. The base of transistor Q11 has one phase of the incoming signal at its base input while the base of Q12 receives the opposite phase. A peak holding capacitor 27 has one end connected to the emitters of transistors Q11 and Q12 and to the base of Q14. The other end of capacitor 27 is connected to the common reference 50. When the signal at the collector of transistor Q7 reaches its peak value, transistor Q12 is turned on and charges the capacitor to the maximum amplitude of the waveform. The 0.7 volt base-emitter drop across the base-emitter of transistor Q12 is compensated for by the 0.7 volt d-c bias described hereinabove. When the input signal reverses polarity, the collector of transistor Q6 goes high and then transistor Q11 charges capacitor C2 to the peak value of the new pulse. The time constant of capacitor 27 and the loads thereon are long enough to retain the peak value until the next positive or negative peak occurs, i.e., a full slicing cycle. Thus, the d-c voltage $V_c$ across C2 is equal to ½ of the average of the peak values of the positive and negative input signal pulses.

The slicer circuit is comprised of transistors Q14 through Q18 and associated components. Transistors Q14 and Q15 form a differential pair. A fourth bias source is provided by transistor Q16 and resistor R18. The base and collector of transistor Q15 are connected together to make the differential pair a voltage follower. Hence, the voltage $V_c$, representing the peak excursion voltage of the input signal pulse from transistors Q6 and Q7, is found in buffered form at the collector of transistor Q15. The slicing voltage $V_s$ is then derived by means of the resistance network of R20 and R21, i.e., $$V_s = V_c R_{21}/R_{21} + R_{20}.$$

As described above, capacitor 28 is used to obtain the required a-c bypassing to ground. Transistors Q17 and Q18 are the actual slicers and provide for the slicing of the inverted and noninverted excursions of the outputs from transistors Q6 and Q7. A summation of the two sliced signals is accomplished by connecting the collectors of transistors Q17 and Q18 together. The base-emitter bias on the collectors of transistors Q6 and Q7 is subtracted out by the base-emitter drops of transistors Q17 and Q18. The slicer is constructed to supply gain to the sliced waveform. As is well known, the gain is related to resistors R22, R23, R24 and the impedance of a phase network 46. The slicing of both signal pulse polarities is not necessary but is done here to obtain additional signal strength.

Phase correction is commonly employed in clock recovery circuits. In the use of this integrated circuit, a discrete low-Q variable circuit, phase network 46 tuned at the bit rate, is connected to the collectors of transistors Q17 and Q18, with the other end of the circuit connected to the collector of Q19, as shown. The phase network 46 may be connected to the base of transistor 21 via a small capacitor, as shown. Alternatively, the network is not directly connected to the base of transistor 21, but rather it is simply connected between the collectors of Q17 - Q18 and Q19. Then, the base of resistor R30; thus, twice the current that flows through transistor Q21 flows through transistor Q22. Resistor R29 provides a current-to-voltage conversion. Resistor R27 is a feedback resistor that affects the gain and controls the bias point of the amplifier. Because Q21 is connected as a diode, the input impedance of this amplifier is low. Transistor Q23 provides a low impedance output drive to the clock filter.

For the preferred embodiment of the invention, the integrated transistors should have the following characteristics. It is to be noted that for low mega-Hertz frequencies, such as are employed in the preferred embodiment, many of the standard transistor types could be readily employed.

ELECTRICAL CHARACTERISTICS — $T_A = 25°\ C$

| Parameter | Symbol | Test Conditions | Minimum | Typical | Maximum | Units | Temperature Coefficient |
|---|---|---|---|---|---|---|---|
| Collector-Base Breakdown Voltage | $V_{(BR)CBO}$ | $I_C=10\mu A, I_E=0$ | 20 | 60 | | V | |
| Collector-Emitter Breakdown Voltage | $V_{(BR)CEO}$ | $I_C=1mA, I_E=0$ | 20 | 25 | | V | |
| Collector-Substrate Breakdown Voltage | $V_{(BR)CSO}$ | $I_C=10\mu A, I_B I_B=0$ | 20 | | | V | |
| Emitter-Base Breakdown Voltage | $V_{(BR)EBO}$ | $I_E=10\mu A, I_C=0$ | 5.9 | 6.4 | 6.9 | V | +3mV/° C |
| Collector Cutoff Current | $I_{CBO}$ | $V_{CB}=15V$ | | | 50 | nA | |
| Emitter Cutoff Current | $I_{EBO}$ | $V_{EB}=4.5V$ | | | 50 | nA | |
| Static Forward Current Transfer Ratio (Beta) | $h_{FE}$ | $I_C=1mA, V_{CE}=5V$ | 50 | 150 | | | 0.5%/° C |
| Beta Match | $h_{FE}$ $\Delta h_{FE}/h_{FE}$ | $I_C=100\mu A, V_{CE}=5V$ $I_C=1mA, V_{CE}=5V$ | 33 | 110 ±10% | ±20% | | |
| Base-Emitter Voltage | $V_{BE}$ | $I_C=1mA, V_{CE}=5V$ | 0.66 | 0.71 | 0.76 | V | −2mV/° C |
| Base-Emitter Voltage Match | $V_{BE}$ $\Delta V_{BE}$ | $I_C=100\mu A, V_{CE}=5V$ $I_C=1mA, V_{CE}=5V$ | 0.60 | 0.65 ±3 | 0.70 ±10 | V mV | 10μV/° C |
| Collector-Emitter Saturation Voltage | $V_{CE(sat)}$ | $I_B=1mA, I_C=10mA$ | | 0.5 | | V | |
| Small Signal Common-Emitter Input Impedance | $h_{ie}$ | $f=1kHz$ $I_C=1mA, V_{CE}=5V$ | | 4.7 | | kΩ | |
| Small Signal Common-Emitter Forward Current Transfer Ratio | $h_{fe}$ | $f=1kHz$ $I_C=1mA, V_{CE}=5V$ | | 180 | | | |
| Small Signal Common-Emitter Reverse Voltage Transfer Ratio | $h_{re}$ | $f=1kHz$ $I_C=1mA, V_{CE}=5V$ | | $2\times10^{-4}$ | | | |
| Small Signal Common-Emitter Output Admittance | $h_{oe}$ | $f=1kHz$ $I_C=1mA, V_{CE}=5V$ | | 10 | | μmho | |
| Collector-Base Capacitance | $C_{CB}$ | $V_{CB}=2V, I_C=0$ | | 0.3 | | pF | |
| Emitter-Base Capacitance | $C_{EB}$ | $V_{EB}=2V, I_E=0$ | | 0.5 | | pF | |
| Collector-Substrate Capacitance | $C_{CS}$ | $V_{CS}=2V, I_C=0$ | | 1.5 | | pF | |
| Gain-Bandwidth Product | $f_T$ | $I_C=1mA, V_{CE}=5V$ | | 400 | | mHz | | transistor 21 is connected to path 48 and a large capacitor (about 0.1 microfarad) is connected between path 48 and the base of transistor Q21. There is a phase difference of about 90° in the use of these two different connections, and the selection of one or the other is dependent upon design as is well known. This provides a pre-filter function and a means of adjusting the phase of the recovered clock timing signal. Transistor Q19 is a buffer stage between the slicers and the output amplifier. Its active load is the current source formed by Q20.

After the signal has been sliced and passed through the phase network 46, it is amplified by the amplifier comprising transistors Q21 through Q24. A fifth bias source is provided by transistor Q24 which supplies a current source load for the output driver of this amplifier, transistor Q23. Transistor Q21 is connected as a diode and, thus, provides a current mirror to transistor Q22. Resistor R28 is selected to be twice the value of The remaining circuit components are as follows:

| Resistor | Value (Ω) | Resistor | Value (Ω) |
|---|---|---|---|
| R1 | 400 | R21 | 4.0K |
| R2 | 5.0K | R22 | 4.0K |
| R3 | 4.0K | R23 | 3.9K |
| R4 | 4.0K | R24 | 200 |
| R5 | 7.5K | R25 | 1.0K |
| R6 | 7.5K | R26 | 2.0K |
| R7 | 500 | R27 | 12.0K |
| R8 | 500 | R28 | 400 |
| R9 | 3.0K | R29 | 8.0K |
| R10 | 1.0K | R30 | 200 |
| R11 | 1.0K | R31 | 500 |
| R12 | 400 | C1 | .1μf$_M$ |
| R13 | 4.0K | C2 | 20V { 68.μf$_T$ |
| R14 | 8.0K | C3 | 4.7μf$_T$ |
| R15 | 3.5K | | |
| R16 | 7.5K | | |
| R17 | 1.0K | | |

-continued

The remaining circuit components are as follows:

| Resistor | Value (Ω) | Resistor | Value (Ω) |
|---|---|---|---|
| R18 | 1.0K | | |
| R19 | 13K | | |
| R20 | 500 | | |

M = Monolithic Ceramic
T = Tantalum
Resistor values are ± 30%, Resistor match ± 5%

What is claimed is:

1. In combination, integrated circuit means and discrete circuit means arranged for generating a clock drive signal from a pseudo-ternary signal, which comprises:
   buffering means having an output, and having an input connected to receive a digital signal;
   coupling means having an output, and having an input connected to the output of said buffering means;
   precision gain means having an input connected to the output of said coupling means and having a first output which provides amplified positive excursions and a second output which provides amplified inverted negative excursions of the pseudo-ternary signal;
   peak detection means having first and second inputs connected, respectively, to the first and second outputs of said precision gain means, and having an output;
   means for storing the peak amplitude output from said detection means, said storing means having an input connected to the output of said peak detection means and having an output;
   means for establishing a slicing level amplitude in relation to said peak amplitude, said establishing means having an input connected to the output of said storing means and having an output;
   means for slicing the digital signal having first and second inputs, respectively, connected to the first and second outputs of said precision gain means, having a third input connected to the output of said establishing means, and having an output;
   means for adjusting the phase of the sliced signal, having an input connected to the output of said slicing means, and having an output; and
   means for increasing the output amplitude of said sliced signal having an input connected to the output of said adjusting means and having an output.

2. Apparatus according to claim 1 wherein said buffering means further comprises:
   a power source providing positive and negative supply voltages;
   a first bias source having an input connected to the negative supply voltage and providing at its output a reference current; and
   a buffer amplifier comprising a first integrated circuit transistor having base, emitter and collector, said base being connected to receive the pseudo-ternary signal, said collector connected to said positive supply source and said emitter being connected to the output of said first bias source.

3. Apparatus according to claim 2 wherein said coupling means further comprises a capacitor.

4. Apparatus according to claim 3 wherein said precision gain means further comprises:
   a first integrated circuit differential amplifier having one input connected to said a-c coupling means, having second and third inputs and said first and second outputs;
   a second bias source having an input connected to said negative supply source and providing a reference current into said second input of said first integrated circuit differential amplifier; and
   a third bias source having an input connected to said positive supply and providing bias voltage compensation, which is equal to the base emitter voltage drop of a transistor in said differential pair, said third source having an output connected to the third input of said differential pair.

5. Apparatus according to claim 4 wherein said peak detection means further comprises:
   a first integrated circuit transistor amplifier for amplifying the positive excursions of the pseudo-ternary pulses having an input connected to receive the positive excursions from the first output of the first integrated circuit differential amplifier and having an output; and
   a second integrated circuit transistor amplifier for amplifying the inverted negative excursions of the input pseudo-ternary pulses having an input connected to receive the inverted negative excursions from the second output of the first integrated circuit differential amplifier and having an output, said output being connected to the output of said first integrated circuit transistor amplifier.

6. Apparatus according to claim 5 wherein said means for storing further comprises a capacitor and associated circuitry having a time constant which will hold the peak signal input for a full slicing cycle.

7. Apparatus according to claim 6 wherein said means for establishing a slicing level amplitude further comprises:
   a fourth bias source having an input connected to the negative supply source and providing a reference current at its output;
   a second integrated circuit differential amplifier connected as a voltage follower, having an input connected to receive said peak signal, having a second input connected to the output of said fourth bias source, and having an output;
   a voltage divider having an input connected to the output of said second differential amplifier and providing a slicing level signal, $V_s$, at its output; and
   a capacitor connected between the output of said voltage divider and ground.

8. Apparatus according to claim 7 wherein said means for slicing further comprises:
   a second integrated circuit transistor having a base connected to receive one polarity of the received pseudo-ternary signal, a collector connected to the positive power supply source and having the emitter connected to the slicing level voltage output; and
   a third integrated circuit transistor having a base connected to receive the opposite polarity of the pseudo-ternary signal, having a collector connected to the positive supply source and also connected to the collector of said second integrated circuit transistor, and having its emitter connected to the emitter of said second integrated circuit transistor.

9. Apparatus according to claim 8 wherein said means for adjusting the phase further comprises an adjustable low-Q tuned phase shifting network.

10. Apparatus in accordance with claim 9 wherein said means for increasing the output amplitude further comprises a fourth integrated circuit transistor amplifier.

* * * * *